(12) United States Patent
Pier et al.

(10) Patent No.: US 8,985,307 B2
(45) Date of Patent: Mar. 24, 2015

(54) SINGULATOR FOR SORTING RANDOM ITEMS

(75) Inventors: Michael T. Pier, Fox Point, WI (US); Kurt D. Ashbrenner, Hartland, WI (US)

(73) Assignee: Nordco Inc., Oak Creek, WI (US)

( * ) Notice: Subject to any disclaimer, the term of this patent is extended or adjusted under 35 U.S.C. 154(b) by 667 days.

(21) Appl. No.: 13/053,526

(22) Filed: Mar. 22, 2011

(65) Prior Publication Data

US 2012/0241287 A1    Sep. 27, 2012

(51) Int. Cl.
*B65G 47/14*    (2006.01)
*E01B 29/26*    (2006.01)

(52) U.S. Cl.
CPC ........ *B65G 47/1471* (2013.01); *B65G 47/1492* (2013.01); *E01B 29/26* (2013.01)
USPC ............................ 198/396; 198/445; 198/773

(58) Field of Classification Search
USPC .................. 198/396, 771, 773, 443, 445, 446
See application file for complete search history.

(56) References Cited

U.S. PATENT DOCUMENTS

| | | | |
|---|---|---|---|
| 1,615,137 A | | 1/1927 | Ruby |
| 1,747,140 A | | 2/1930 | Smith |
| 1,865,086 A | * | 6/1932 | Cutler ............................ 198/382 |
| 2,015,187 A | * | 9/1935 | Mayer ............................ 198/453 |
| 2,728,443 A | * | 12/1955 | Pike, Jr. et al. ................ 198/383 |
| 2,818,967 A | * | 1/1958 | Bogle ............................ 198/773 |
| 3,203,590 A | | 8/1965 | Maki |
| 3,265,195 A | * | 8/1966 | Ford ............................... 198/773 |
| 3,524,532 A | * | 8/1970 | Hobbs ............................ 198/773 |
| 3,547,253 A | * | 12/1970 | Ford ............................... 198/737 |
| 3,581,665 A | | 6/1971 | Johnson |
| 3,768,626 A | * | 10/1973 | Vossler et al. ................. 198/398 |
| 3,907,099 A | | 9/1975 | Smith |
| 4,014,460 A | | 3/1977 | Bryan, Jr. |
| 4,662,506 A | * | 5/1987 | Tueckmantel et al. ...... 198/463.5 |
| 5,385,227 A | * | 1/1995 | Marsh ............................ 198/773 |
| 5,398,616 A | | 3/1995 | Eidemanis et al. |
| 5,465,667 A | | 11/1995 | Hosking et al. |
| 5,647,472 A | * | 7/1997 | Fierkens ........................ 198/443 |
| 5,678,681 A | * | 10/1997 | Klockars et al. .............. 198/773 |
| 6,116,409 A | * | 9/2000 | Yokajty et al. ................ 198/771 |
| 6,155,175 A | | 12/2000 | Rude et al. |
| 6,257,395 B1 | | 7/2001 | Yokajty et al. |
| 7,104,200 B2 | | 9/2006 | Hosking et al. |
| 7,216,590 B2 | | 5/2007 | Eldridge et al. |

* cited by examiner

*Primary Examiner* — William R Harp
(74) *Attorney, Agent, or Firm* — Greer, Burns & Crain, Ltd.

(57) ABSTRACT

A singulator for sorting a single item from a supply of such items stored randomly in bulk is provided, including at least one primary vertically reciprocating elevator defining a platform reciprocating between first lower position in which the platform receives and holds an initially limited number of the items delivered from bulk storage, and a first upper position in which the items are delivered to at least one secondary elevator. Each secondary elevator has a second platform and reciprocates between a second lower position in which the second platform receives a further limited number of the items and a second upper position in which the items are delivered to a desired location. The platforms are constructed and arranged for orienting the items in a desired orientation at the desired location.

18 Claims, 9 Drawing Sheets

SINGULATOR FOR SORTING RANDOM ITEMS

RELATED APPLICATION

The present application is related to commonly-assigned, US Patent applications for Tray for Orienting and Conveying Items, Ser. No. 13/053,531, now U.S. Pat. No. 8,474,597 and for Automatic Spike Feeder System, Ser. No. 13/053,523, now U.S. Pat. No. 8,516,965.

BACKGROUND

The present invention relates generally to material handling equipment, and more specifically to equipment for sorting and orienting loose items provided in bulk such as rail spikes and similar fasteners.

Currently, rail spikes used in a rail maintenance gang are stored in bulk and delivered in relatively small groups to an operator station by a reciprocating ram, as disclosed in commonly-assigned U.S. Pat. No. 7,216,590 which is incorporated by reference. In conventional rail maintenance operations employing the reciprocating ram, a designated operator draws individual spikes from the small group supplied by the ram, manually orients them in proper top-to-bottom and front-to-back position, and inserts them into a feed tray of a rail fastener driver magazine, of the type disclosed in commonly-assigned U.S. Pat. Nos. 5,398,616; 5,465,667 and 7,104,200, all of which are incorporated by reference.

There is a continuing motivation by railroads to reduce the required labor of rail maintenance operations. Accordingly, maintenance machinery manufacturers have attempted to automate tasks where possible.

SUMMARY

The above-identified need for continued automation of rail maintenance tasks is met by the present singulator, designed for receiving randomly oriented, bulk-stored items such as rail spikes or other fasteners, and automatically delivering them in a desired orientation such that further sorting and orienting operations can be performed. In the preferred embodiment, the singulator includes a supply device or separator that provides a supply of randomly arranged items from a bulk feeder used to separate small groups of items from the supply.

In the preferred embodiment, the separator is a reciprocating, pivoting wedge that delivers a supply of the items from bulk to a primary elevator including a first stage with at least one vertically reciprocating elevator located in operational relationship to the separator. It is preferred that the primary elevator has two such stages, a first and a second stage. The primary elevator vertically elevates and delivers a reduced number, such as four or five items, ultimately to a secondary elevator.

It is preferred that a fixed shelf is positioned between the primary and secondary elevators. The shelf is preferably inclined so that items placed there by the primary elevator slide onto a third stage of the secondary elevator. As is the case with the primary elevator, the secondary elevator preferably has a pair of vertically reciprocating elevators for further reducing the number of items, and for orienting the items in a desired horizontal position. Preferably, the movement of the respective stages within the primary and secondary elevators is equal and opposite, such that when one stage is accepting items, the other is delivering them.

The third and fourth stages each have platforms with a smaller surface area compared to the first and second stage platforms. The ultimate delivery of a single item from the fourth stage is accomplished with the assistance of a multiple-item preventer, which removes extra items carried by the fourth stage elevator. When multiple elevators are provided, multiple flow paths of items are available.

More specifically, a singulator for sorting a single item from a supply of such items stored randomly in bulk is provided, including at least one primary vertically reciprocating elevator defining a platform reciprocating between a first lower position in which the platform receives and holds an initially limited number of the items delivered from bulk storage, and a first upper position in which the items are delivered to at least one secondary elevator. Each at least one secondary elevator has a second platform and reciprocates between a second lower position in which the second platform receives a further limited number of the items and a second upper position in which the items are delivered to a desired location. The platforms are constructed and arranged for orienting the items in a desired orientation at the desired location.

In another embodiment, a singulator is provided for sorting a single item from a supply of such items stored randomly in bulk. A separator is configured for receiving a portion of the items stored in bulk and reciprocating between a receiving position and a delivery position. In the delivery position, the separator delivers a supply of the items by gravity. At least one primary elevator includes first and second stage vertically reciprocating elevators, each defining a platform and reciprocating between a first lower position in which the platform receives and holds a limited number of the items received from the separator, and a first upper position in which the items are delivered. At least one secondary elevator includes third and fourth second stage vertically reciprocating second elevators, each having a second platform and reciprocating between a second lower position in which the second platform receives a further reduced number of the items received from the first elevator, and a second upper position in which the items are delivered to a desired location. The second platforms are smaller in area than the first platforms.

DETAILED DESCRIPTION

Figure 1:
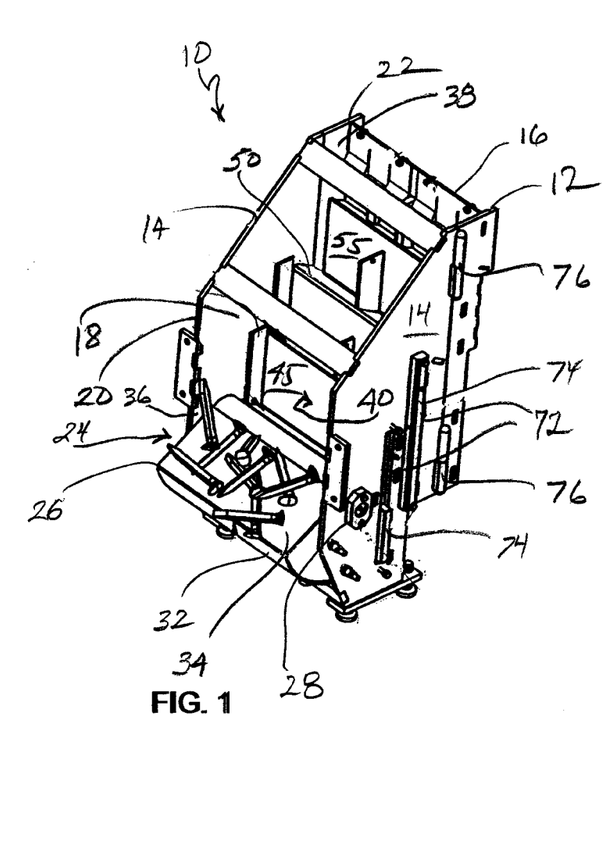
FIG. 1 is a top perspective view of the present singulator.
Figure 2:
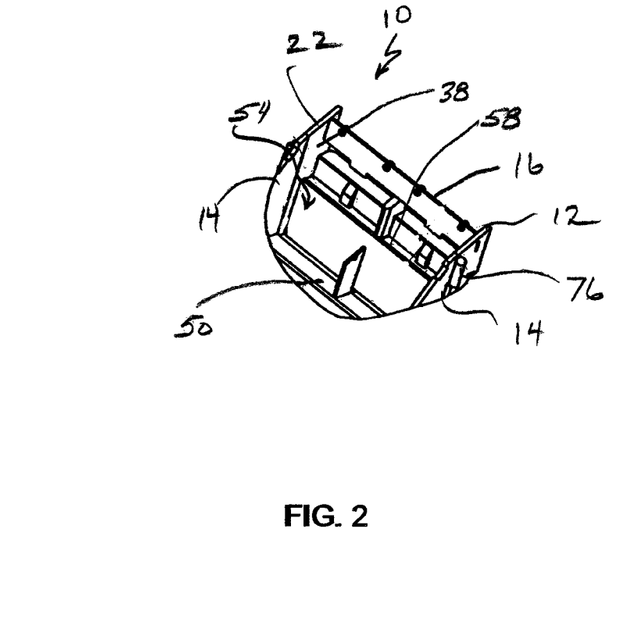
FIG. 2 is a fragmentary top perspective of the singulator of FIG. 1.

Referring to FIG. 1, the present singulator is generally designated 10 and is preferably used with a bulk bin loader as disclosed in U.S. Pat. No. 7,216,590 which is incorporated by reference. The bulk bin loader (not shown) is mounted on a mobile track maintenance unit, such as a rail fastener driver of the type disclosed in U.S. Pat. No. 7,104,200 incorporated by reference. A large bin (not shown) is provided for storing a supply of items to be sorted. In the preferred embodiment, the items are rail spikes, however it is contemplated that other types of rail fasteners, such as lag screws, Lewis bolts or the like, or other types of bulk stored items could be used. The bin loader also includes a hopper at the bottom of the bin, and a reciprocating ram receives a small supply of the items stored in the hopper, separates them and pushes them towards an outlet of the loader.

The present singulator 10 is constructed and arranged to be operationally disposed adjacent the outlet of the loader, so that the supply of items separated by the reciprocating ram is available to the singulator. While in the preferred embodiment, the singulator 10 is mounted in a rail fastener applicator vehicle, preferably a spike driver, it is also contemplated that the singulator could be a stand-alone unit or could be configured for working with another type of bulk loader if needed.

Figure 16:
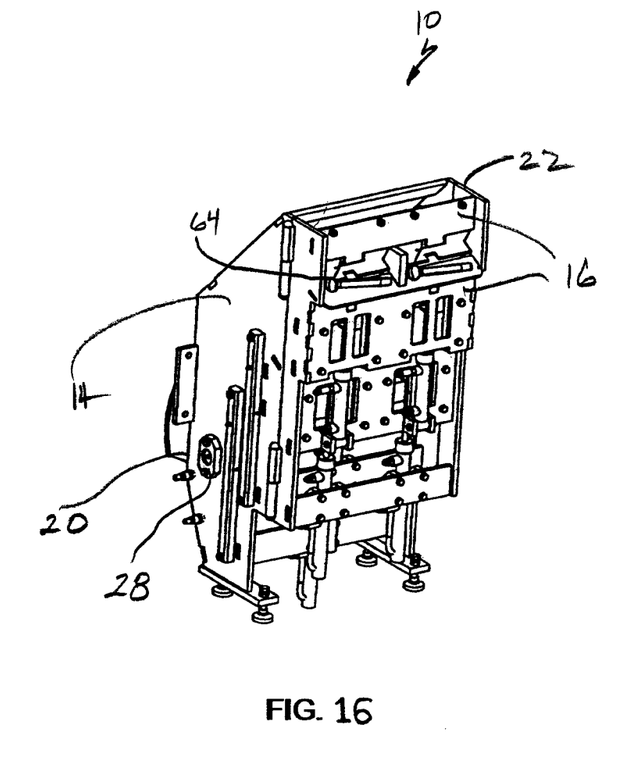
FIG. 16 is a top perspective of the present singulator showing items being delivered from the second stage to a desired destination.

Basically, the purpose of the singulator is to deliver single, sorted and oriented items from a supply of bulk, randomly oriented items. As described above, the preferred item is a rail spike, but other similar items are contemplated. The singulator 10 includes a frame 12 having a pair of parallel sidewalls or plates 14 spaced apart by at least one and preferably a plurality of rear walls or plates 16 (FIG. 16). A cavity or work chamber 18 is defined by the plates 14 and 16. Also, the frame 12 is configured so that a front vertical edge 20 is disposed below and in front of a top rear edge 22 of the frame. It will be appreciated that the front edge 20 is preferably disposed in close operational relationship a supply of the items 24, such as are delivered by the reciprocating ram of the bulk bin loader, described above.

Figure 3:
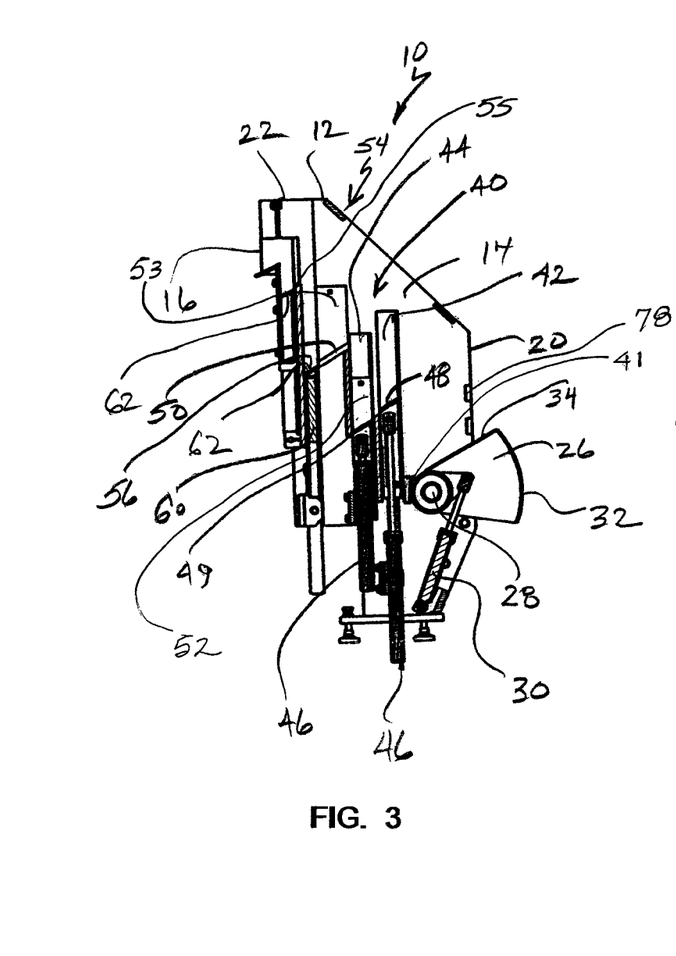
FIG. 3 is a fragmentary side elevation of the present singulator, with portions removed for clarity.
Figure 4:
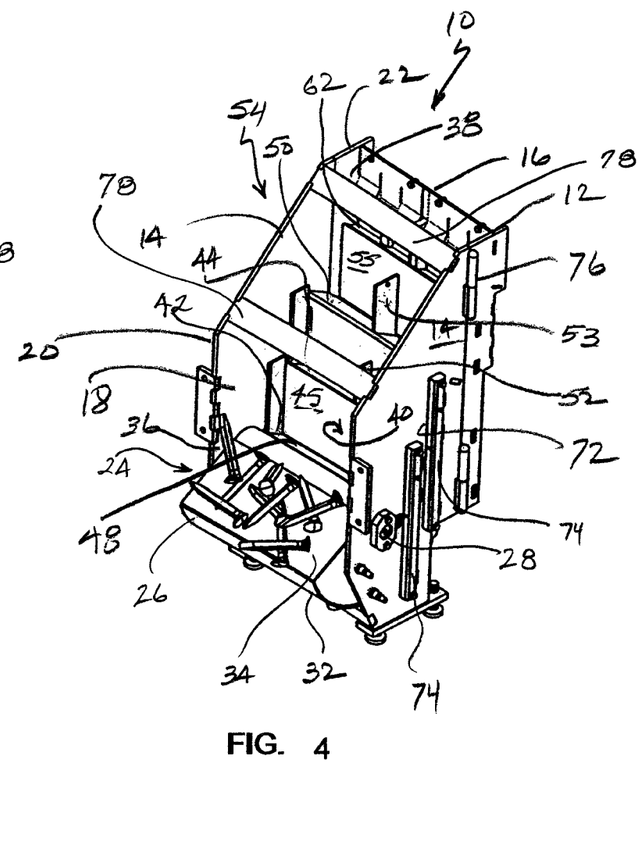
FIG. 4 is a top perspective view of the present singulator with the separator depicted in a lower position.
Figure 5:
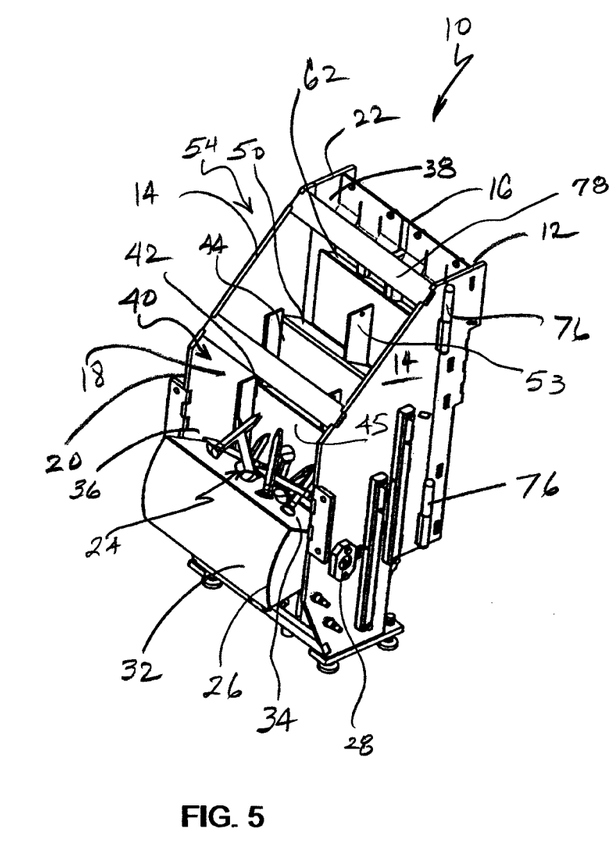
FIG. 5 is a top perspective view of the present singulator with the separator depicted in an upper, delivery position and the first stage in a lower, receiving position.
Figure 6:
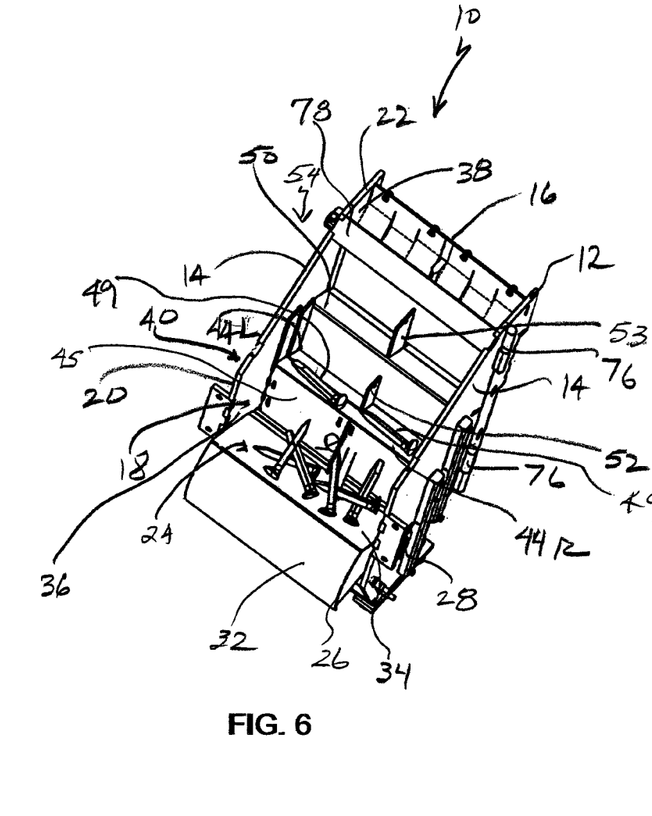
FIG. 6 is a top perspective view of the present singulator with items caught on the first platforms as the first stage moves upward, and the second stage moves downward.

Referring now to FIGS. 3-5, an isolation wedge or separator 26 is disposed on the frame 12 generally horizontally relative to the front vertical edge 20. More specifically, the separator 26, generally wedge-shaped when viewed from the side (FIG. 3) is pivotally mounted to each of the side plates 14 to pivot about a generally horizontal axis between a lowered, receiving position (FIG. 4) at which a supply of the items 24 is obtained from the larger supply provided by the ram, and a raised, delivery position (FIG. 5). Suitable bearings 28 support the pivoting movement of the separator 26. While other drive systems are contemplated, the separator 26 is powered in this reciprocating action by a fluid power cylinder 30 (FIG. 3) mounted at one end to the frame 12 below the separator and at the opposite end to the separator itself. A free end 32 of the separator 26 is preferably arcuate to prevent jams caused by items 24 becoming stuck between the free end and the corresponding components of the ram A top surface 34 of the separator 26 is joined to the free end, preferably by welding or being made of a single formed sheet, and receives the items 24.

As seen in FIGS. 4 and 5, the reciprocating separator 26 delivers a supply of the items 24 into the work chamber 18 defined by the side plates 14 and the rear plates 16. A lower end 36 of the work chamber is adjacent the separator 26, and an upper end 38 is opposite the lower end. Thus, movement of items through the separator 10 is upward and away from both the separator 26 and a primary elevator 40. A transverse transition piece 41 is attached at each end to a respective one of the side plates 14 and is mounted between the separator 26 and the primary elevator 40 to prevent items 24 from becoming jammed in a space between these components, while permitting free movement of the separator.

Referring now to FIGS. 3-9, and 15, in the work chamber 18, the primary elevator 40 includes at least one and preferably two stages of vertically reciprocating elevators, designated a first stage 42 and a second stage 44. The first and second stages 42, 44 are oriented in generally vertical, adjacent and parallel relationship to each other and are separated by a vertical plate 45 fixed to the frame 12. The plate 45 separates the first and second stages 42, 44 and provides a backstop for the items 24 as they are moved upwards by the reciprocating stages. Fluid power cylinders 46 secured to the frame 12 power the stages 42, 44. In the present singulator 10, the preferred fluid power cylinder is hydraulic. Each of the stages 42, 44 is provided with a first platform 48, 49 reciprocating between a first lower position (FIGS. 4 and 5 for the first stage 42) in which the platform receives and holds a limited number, preferably four or five, of the items 24 delivered from bulk storage, and a first upper position (FIG. 6 for the first stage 42) in which the items are ultimately delivered.

Since the first and second stages 42, 44 are powered in equal and opposite relation to each other, one is in an uppermost position while the other is in a lowermost position (closer to the separator 26) to facilitate the sorting and separating of the items 24 provided by the separator. FIG. 3 depicts the first stage 42 in an uppermost position and the second stage 44 in a lowermost position. During this operation, items 24 will be transferred from the corresponding platform 48 of the first stage 42 to the platform 49 of the second stage 44. The goal of the primary elevator 40 is to deliver a limited supply of horizontally oriented items 24 to a stationary shelf 50 (FIGS. 3, 4 and 15) where they reside temporarily before further handling. To facilitate this transfer, both of the platforms 48, 49 are inclined so that a lower edge is adjacent the shelf 50 and the items 24 slide by gravity upon the shelf, since an uppermost travel limit of the second stage 44 is higher on the frame 12 than the shelf.

It should be noted that the shelf 50 is preferably located approximately midway up the total height of the frame 12. The shelf 50 provides a temporary storage area for the items 24 conveyed by the primary elevator 40. This temporary storage area promotes constant flow of the items 24 at a desired velocity. It is also preferred, to speed the delivery of items 24, that the second stage 44 of the primary elevator 40 includes adjacent pairs of platforms 49 (FIGS. 6 and 7) for defining multiple supply paths 44L, 44R of the items to the desired location. In the preferred embodiment, the second stage 44 is provided with a vertically projecting divider bar 52 (FIGS. 3 and 7) fixed to the platform 49 for defining the adjacent supply paths 44L, 44R On the fixed shelf 50, another fixed vertical divider plate 53 is provided for maintaining the multiple paths.

Figure 7:
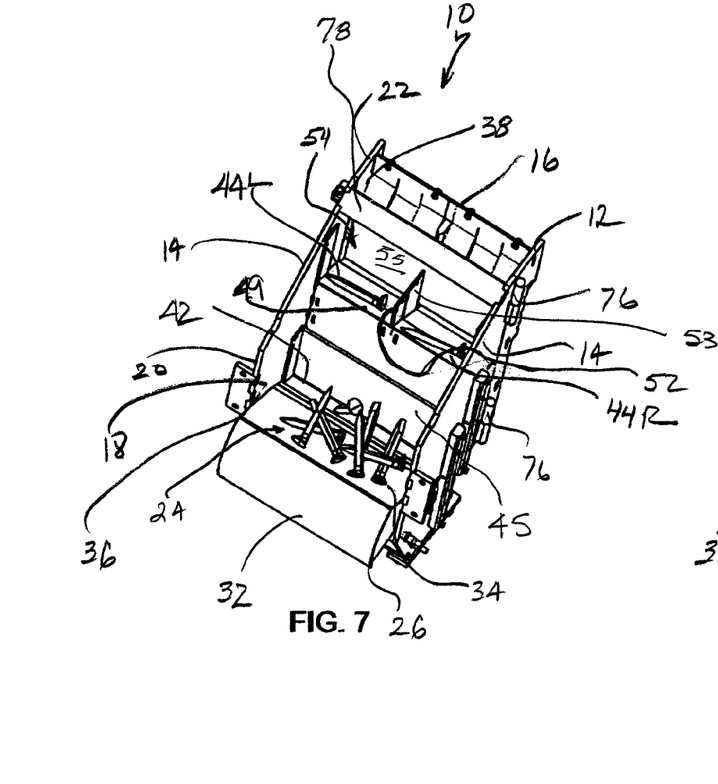
FIG. 7 is a top perspective view of the present singulator with items caught on the second platforms as the second stage moves upward and the first stage moves downward.
Figure 8:
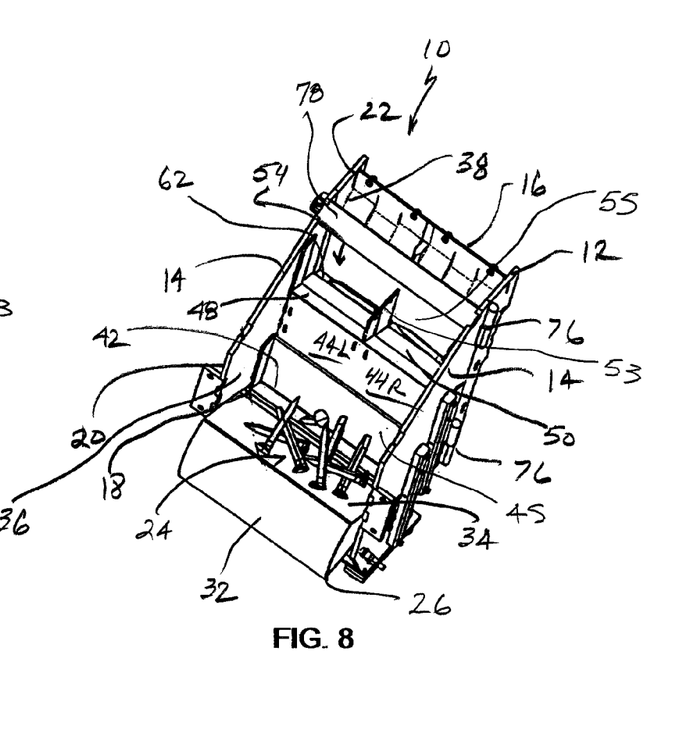
FIG. 8 is a top perspective view of the present singulator showing items moving from a stationary shelf on onto the third stage, a first step in the secondary elevator.

Referring now to FIG. 7, once on the stationary shelf 50, the items 24 are now horizontally oriented in a direction transverse to the direction of travel of the items through the singulator 10. Since the shelf 50 is inclined in the same manner and at about the same angle (approximately 25-30°) as the first platforms 48, 49, the items 24 eventually slide by gravity to a secondary elevator 54, and in this manner the delivery of items is facilitated. A vertical plate 55 (FIGS. 3, 7 and 8) is fixed to the frame 12 in similar fashion to the plate 45 for retaining or forming a back stop for any items 24 that slide forward from the shelf 50 onto the secondary elevator 54 (stage 56).

Referring now to FIGS. 2, 3, 7-10 and 15, similar to the primary elevator 40, the secondary elevator 54 includes at least one and preferably two stages of vertically reciprocating elevators, designated a third stage 56 and a fourth stage 58. The third and fourth stages 56, 58 are oriented in generally vertical, adjacent and parallel relationship to each other and are powered by corresponding fluid power cylinders 60 secured to the frame 12 (FIG. 3). Each of the stages 56, 58 is provided with a second platform 62 reciprocating between a second lower position (FIG. 5) in which the platform receives and holds a further limited number, preferably one or two, of the items 24 received from the primary elevator 40 and the stationary shelf 50, and a second upper position in which the items are ultimately delivered. In the preferred embodiment each second platform 62 has a length of approximately 8.75 inches to accommodate the length of a conventional spike 24 and to allow some freedom of movement of the spike/item on the platform. Each of the platform sections 49 on the divided stage 44 has a similar dimension.

Since the secondary elevator 54 receives the items 24 in a generally horizontal, transverse orientation to the direction of travel of the items through the singulator 10, this orientation is maintained. However, misaligned items 24 are permitted at this point in the operational sequence. A main function of the secondary elevator 54 is to further reduce the items 24 so that only one or two are delivered at a time to the desired location.

Figure 9:
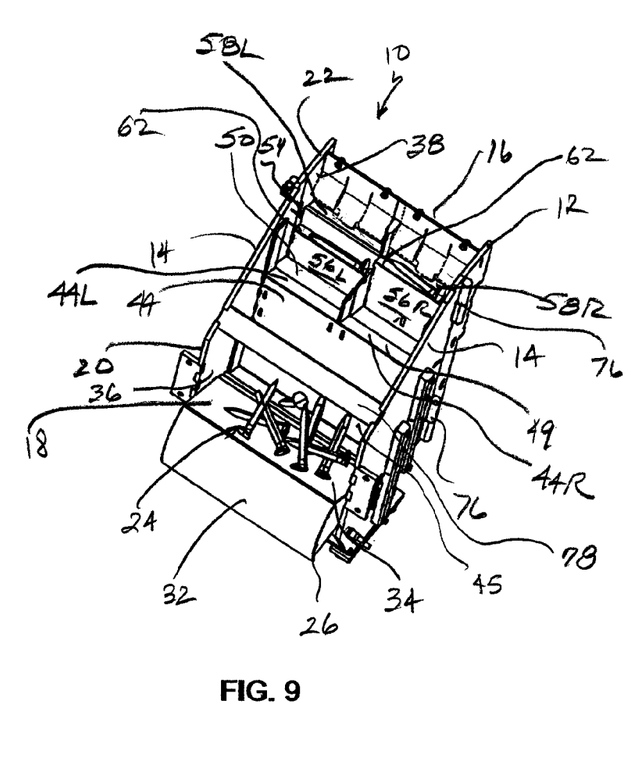
FIG. 9 is top perspective view of the present singulator showing items moving from the third stage to the fourth stage.
Figure 10:
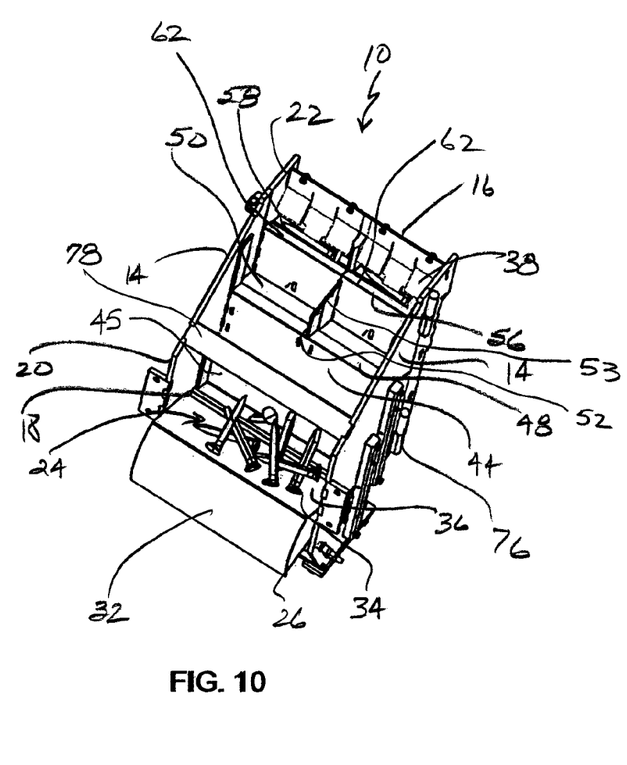
FIG. 10 is a top perspective of the present singulator showing the fourth stage reaching the delivery position.
Figure 11:
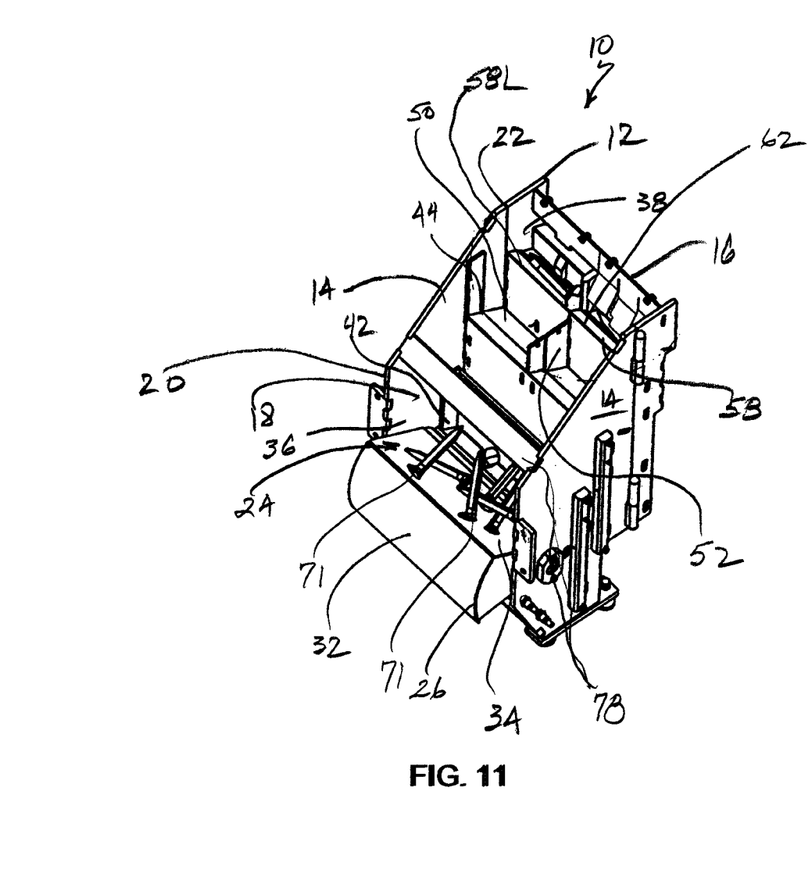
FIG. 11 is a fragmentary top perspective view of the present singulator in operation with items on platform of the fourth stage.
Figure 12:
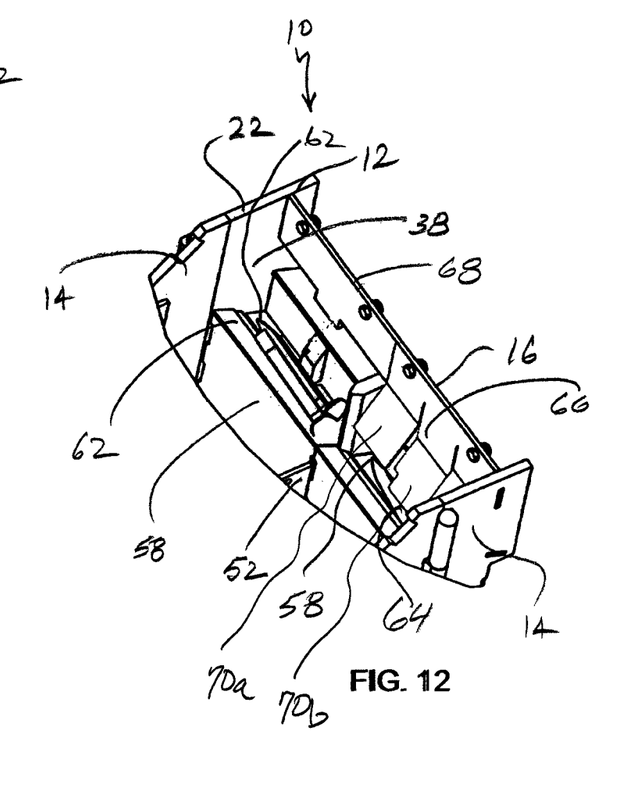
FIG. 12 is an enlarged fragmentary perspective view of the singulator depicted in FIG. 11 showing the items being pushed upward by the fourth stage.

Referring now to FIGS. 3, 9 and 12, as is the case with the primary elevator 40, the stages 56, 58 of the secondary elevator 54 each reciprocate between a second lower position (stage 56 in FIG. 3) in which the second platform 62 of the third stage 56 receives a further reduced number of the items, hopefully only one, and a second upper position (stage 56 in FIG. 9). In the case of the fourth stage 58, in the second upper position, the item 24 is delivered to a desired location 64. In the case of the fourth stage 58, the desired location 64 is an outlet ramp (FIG. 16). Also the third and fourth stages 56, 58 operate in opposite reciprocal cycles similarly to the stages 42, 44 such that when a first elevator in one of the stages is in an up position, the corresponding elevator in the counterpart stage is in a down position.

An important distinction between the primary and the secondary elevators 40, 54 is that in the secondary elevators, the second platforms 62 are smaller in area than the first platforms 48. This reduction in area is intended to limit the number of items 24 carried by the second platforms 62 so that preferably one and no more than two items reaches the desired location 64. In one embodiment, the first platforms 48 are approximately 2 inches deep, and the second platforms 62 are approximately 1.25 inches deep, however the dimensions are not considered critical.

Further, as is the case with the primary elevator 40, to speed the delivery of items 24, in the secondary elevator 54, adjacent pairs of elevators 56L, 56R and 58L, 58R provide multiple supply paths of the items to the desired location. Since there are separate pairs of elevator members, there is no need for the divider bar 52 in the secondary elevator 54.

Figure 13:
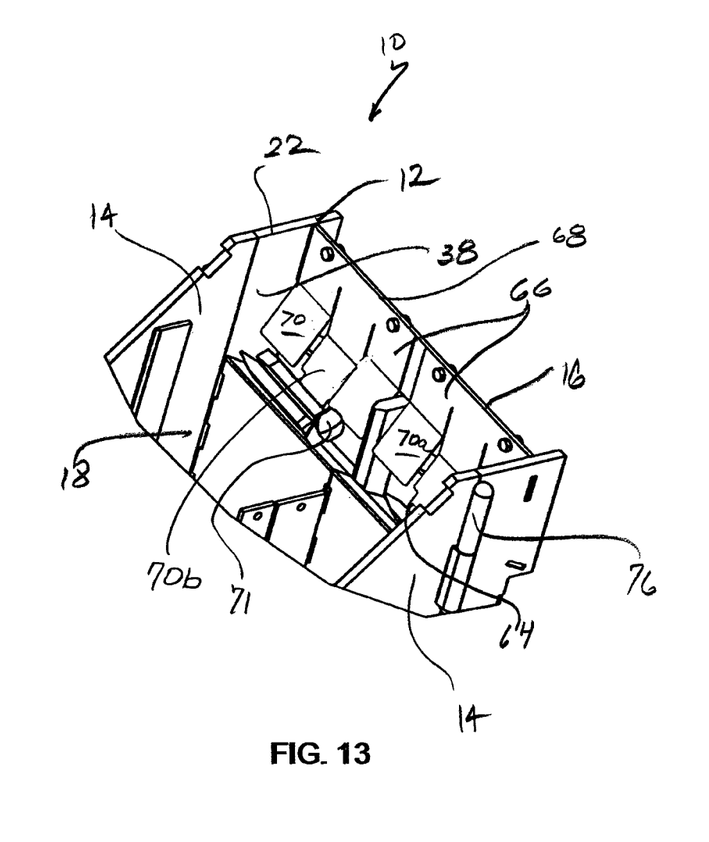
FIG. 13 is an enlarged fragmentary perspective view of the secondary elevator depicting two items on the fourth platform and operation of the multiple item preventer.
Figure 14:
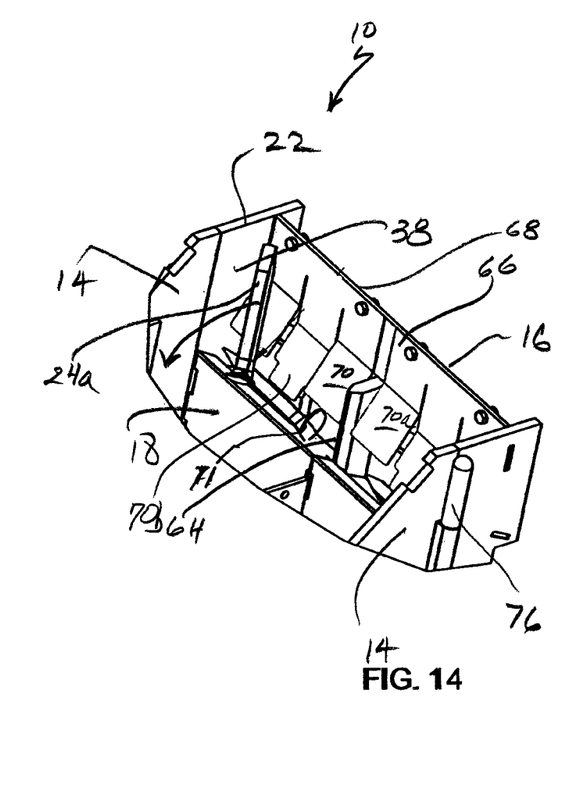
FIG. 14 is an enlarged fragmentary perspective view of the secondary elevator depicting another operational condition in which an item is vertically oriented on the second stage.
Figure 15:
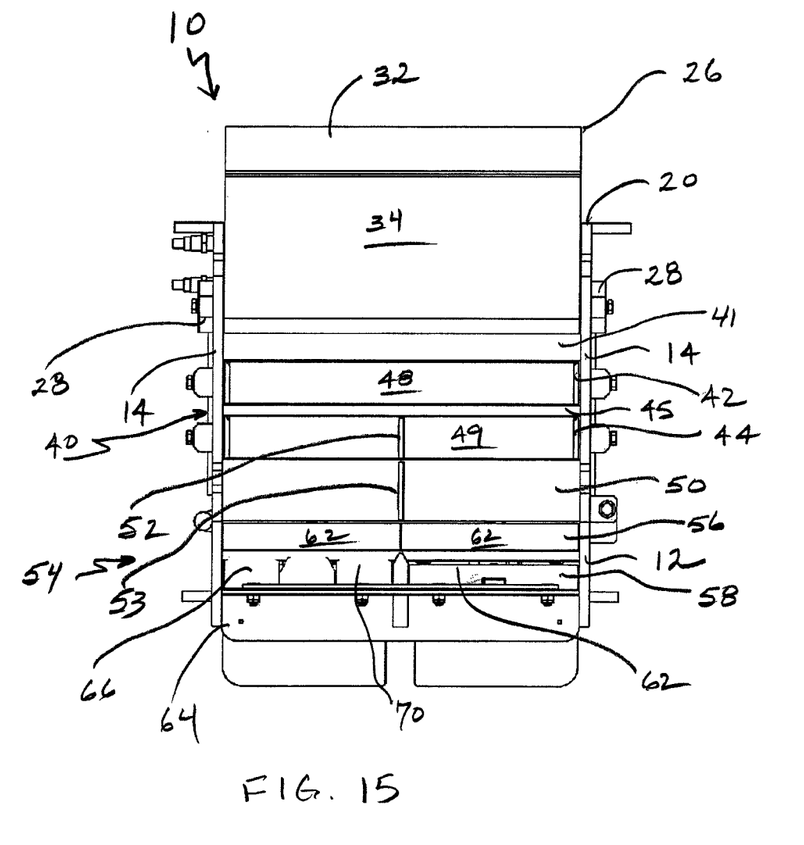
FIG. 15 is an overhead plan view of the present singulator, with portions removed for clarity.

Referring now to FIGS. 12-14, to prevent more than one item 24 from being delivered to the desired location 64, the singulator 10 is preferably provided with a multiple item preventer 66. Fastened to the frame 12 along an upper edge 68, the multiple item preventer 66 is provided with at least one and preferably a plurality of biased, angled petals 70 which project towards the second platform 62 of the fourth stage 58. Biasing action is created by the angled orientation and the thin, plate-like preferably spring steel construction of the petals 70. It is further preferred to provide two distinct petal configurations, labeled 70a, and 70b, with the petals 70b being slightly longer than 70a. The purpose of the petals 70a, 70b is to prevent items 24 from being conveyed one on top of the other (FIG. 13). Further, the length of the petals 70a is intended to permit passage of a spike head 71 in the proper orientation (FIG. 14), while the petal 70b prevents passage of a spike head in that area.

Thus, as the fourth stage 58 reaches the uppermost position (FIG. 12), items 24 in front-to-back arrangement (FIG. 13) are separated and the rearward item knocked off, so that only one item remains on the platform 62. Similarly, if a second item 24a is in a generally vertical position, the petals 70 also knock it off (FIG. 14).

Referring now to FIGS. 1, 3 and 4, it will be seen that the frame 12 surrounds the primary and secondary elevators 40, 54, and the sidewalls 14 define slide tracks 72 supporting the reciprocation of the elevators 42, 44, 56 and 58. Wear pads 74 secured to each elevator 42, 44, 56 and 58 on each side slidably engage the tracks 72. At least one of the sidewalls 14 is hinged at points 76 to facilitate maintenance. Also, in the preferred singulator 10, at least one support truss 78 is provided for strengthening the frame 12.

A control system (not shown) including electronic control units such as programmable chips, circuits and electromagnetic solenoids operates fluid power valves for controlling the cylinders 30, 46 and 60. Timing of the operation of the various reciprocating cycles varies to suit the situation. The reciprocating operational sequence of the separator 26 and the elevators 42, 44, 56, 58 also varies as needed by the spike driving apparatus which is fed by the present singulator 10. In some cases, the elevators 56, 58 may be temporarily stopped, while the elevators 42, 44 are still feeding items 24 to the shelf 50. In addition, the elevators 58 have a shorter vertical stroke than the elevators 56 (3.75 inches and 8.75 inches respectively). Thus, the timing of the operational cycle of the elevators 58 is adjusted so that it corresponds to the timing of the cycle for the elevators 56, so that when one is elevated (up), the other is retracted (down). If desired, optical or magnetic position sensors are contemplated for controlling the movement of these components. A preferred output goal of the singulator 10 is approximately 48 items 24 per minute.

Operator control over the singulator 10 also extends to the bulk bin loader, which provides supplies of items 24 through the action of a reciprocating ram. The operator coordinates the operation of the bin loader ram with the separator 26 to provide the desired number of items 24 as needed at the outlet ramp 64. Also, sensors are provided so that the bin loader does not provide items when the separator 26 is in the up or delivery position. During the operation of the singulator 10, the operator can manually activate the separator 26 to stir the pile of random items 24 being loaded onto the first stage 42.

While a particular embodiment of the present singulator for sorting random items has been shown and described, it will be appreciated by those skilled in the art that changes and modifications may be made thereto without departing from the invention in its broader aspects and as set forth in the following claims.

What is claimed:

1. A singulator for sorting a single item from a supply of such items stored randomly in bulk, the singular comprising:
at least one primary vertically reciprocating elevator defining a first vertical axis and a first platform reciprocating along said first vertical axis between a first lower position in which said first platform receives and holds an initially limited number of the items delivered from bulk storage, and a first upper position in which the items are delivered to at least one secondary elevator;
said at least one secondary elevator defining a second vertical axis and a second platform reciprocating along said second vertical axis between a second lower position in which said second platform receives a further limited number of the items and a second upper position in which the items are delivered to a desired location, said second platforms being constructed and arranged for orienting the items in a desired orientation at the desired location; said at least one primary reciprocating elevator and said at least one secondary elevator both being oriented for reciprocation along a vertical axis such that a single item is delivered by each said second platform at said second upper position; and
a divider attached to at least one of said first platform and said second platform to divide a respective one of said first platform and said second platform into two separate supply path areas for transporting the items.

2. The singulator of claim 1 wherein each said second platform is smaller in area than each said first platform.

3. The singulator of claim 2 wherein said platforms are inclined at an acute angle relative to said vertical axis for delivering the items by gravity to a desired destination.

4. The singulator of claim 1 further including a frame supporting said at least one primary and secondary elevators, said elevators mounted to said frame such that a flow of the items is upward and away from the primary elevator.

5. The singulator of claim 1 further including a frame surrounding said elevators and defining tracks for said reciprocation of said elevators.

6. The singulator of claim 1 further including a separator configured for receiving a portion of the items stored in bulk and reciprocating between a receiving position and a delivery position, in said delivery position, said separator delivering a supply of the items by gravity to said at least one primary elevator.

7. The singulator of claim 1 wherein at least one of said at least one primary elevator and said at least one secondary elevator further include adjacent pairs of elevators for providing multiple supply paths of the items to the desired location.

8. The singulator of claim 1 further including an inclined stationary shelf disposed between said at least one primary elevator and said at least one secondary elevator and constructed and arranged for facilitating the delivery of the items by gravity to said at least one secondary elevator.

9. The singulator of claim 1 wherein said at least one primary elevator includes first and second stage reciprocating elevators, each having inclined platforms and being provided in adjacent pairs for defining multiple supply paths of items to the desired location.

10. The singulator of claim 1 further including a biased multiple item preventer disposed above said secondary elevator adjacent said second upper position for eliminating extra items from said second platform.

11. The singulator of claim 1 wherein said at least one primary elevator delivers a supply of items in the range of four to five items, and said at least one secondary elevator delivers a second supply of items in the range of one to two items.

12. The singulator of claim 1 wherein in each of said at least one primary elevator and said at least one secondary elevator, multiple stages are provided and are constructed and arranged to operate in opposite reciprocal cycles such that when a first elevator in one of said stages is in an up position, the corresponding elevator in said stage is in a down position.

13. The singulator of claim 1 wherein said desired orientation of the items upon deliver at the desired location is horizontal and transverse to a direction of travel.

14. A singulator for sorting a single item from a supply of such items stored randomly in bulk, the singular comprising:
a separator pivotably connected to opposing side plates and having a top surface configured for receiving a portion of the items stored in bulk and pivoting between a receiving position and a delivery position relative to said opposing side plates so that said top surface and said plates define a work chamber dimensioned for receiving a plurality of the items, in said delivery position, said separator delivering the plurality of the items by gravity with each reciprocation;
at least one primary elevator including first and second stage vertically reciprocating elevators each defining a first platform and reciprocating between a first lower position in which said first platform receives and holds a limited number of the items received from said separator, and a first upper position in which the items are delivered;
at least one secondary elevator including third and fourth stage vertically reciprocating second elevators each having a second platform and reciprocating between a second lower position in which said second platform receives a further reduced number of the items and a second upper position in which the items are delivered to a desired location;
said at least one primary reciprocating elevator and said at least one secondary elevator both being oriented for reciprocation along a vertical axis such that a single item is delivered by each said platform at said second upper position; and
said second platform of said at least one secondary elevator having a length and an area that are smaller than a length and an area of said first platform of said at least one primary reciprocating elevator,
wherein the single item has a length that is less than the length of said second platform such that only the single item rests on said second platform.

15. The singulator of claim 14 wherein said first and second platforms are inclined in a forward direction for delivering desired items by gravity flow.

16. The singulator of claim 14 further including a frame surrounding said elevators and defining tracks for said reciprocation of said elevators.

17. The singulator of claim 16 further including a stationary shelf disposed on said frame between said primary and said secondary elevators.

18. The singulator of claim 16 further including at least one reciprocating fluid power cylinder for powering each said elevator in said reciprocating motion.

* * * * *